US010417792B2

United States Patent
Akasaka et al.

(10) Patent No.: US 10,417,792 B2
(45) Date of Patent: Sep. 17, 2019

(54) INFORMATION PROCESSING APPARATUS TO DISPLAY AN INDIVIDUAL INPUT REGION FOR INDIVIDUAL FINDINGS AND A GROUP INPUT REGION FOR GROUP FINDINGS

(71) Applicant: CANON KABUSHIKI KAISHA, Tokyo (JP)

(72) Inventors: Thai Akasaka, Kyoto (JP); Yoshio Iizuka, Takatsuki (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 15/264,622

(22) Filed: Sep. 14, 2016

(65) Prior Publication Data

US 2017/0091949 A1    Mar. 30, 2017

(30) Foreign Application Priority Data

Sep. 28, 2015 (JP) ................................. 2015-190334

(51) Int. Cl.
*G06K 9/00* (2006.01)
*G06T 11/00* (2006.01)
(Continued)

(52) U.S. Cl.
CPC ............ *G06T 11/003* (2013.01); *G06F 16/54* (2019.01); *G06T 7/0012* (2013.01); *G06T 11/60* (2013.01); *G06T 2207/10072* (2013.01); *G06T 2207/30064* (2013.01); *G06T 2207/30096* (2013.01); *G06T 2210/41* (2013.01)

(58) Field of Classification Search
None
See application file for complete search history.

(56) References Cited

U.S. PATENT DOCUMENTS 5,807,256 A    9/1998 Taguchi et al.
7,889,900 B2   2/2011 Weese et al.
(Continued)

FOREIGN PATENT DOCUMENTS

CN    1581172 A     2/2005
CN    10111610 A    1/2008
(Continued)

OTHER PUBLICATIONS

Office Action dated Jun. 19, 2018, issued in corresponding Chinese Patent Application No. 201610841688.5.
(Continued)

*Primary Examiner* — Atiba O Fitzpatrick
(74) *Attorney, Agent, or Firm* — Venable LLP

(57) ABSTRACT

An information processing apparatus includes a region acquisition unit adapted to acquire a plurality of regions of interest on a medical image of an object to be examined, a designation unit adapted to designate regions of interest to be included in the same group out of the plurality of regions of interest, wherein the designation unit designates the regions of interest based on a user's instruction, and a display control unit adapted to cause a display unit to display an individual input region used to input individual findings information for each of the plurality of regions of interest and a common input region used to input findings information common to the regions of interest included in the group. The display control unit causes the display unit to display the individual input region and the common input region.

27 Claims, 12 Drawing Sheets

(51) Int. Cl.
*G06T 7/00* (2017.01)
*G06F 16/54* (2019.01)
*G06T 11/60* (2006.01)

(56) References Cited

U.S. PATENT DOCUMENTS

| | | |
|---|---|---|
| 8,189,888 B2 | 5/2012 | Takahashi |
| 8,194,954 B2 | 6/2012 | Takahashi |
| 8,625,867 B2 | 1/2014 | Moriya |
| 8,730,234 B2 | 5/2014 | Iizuka et al. |
| 9,047,539 B2 | 6/2015 | Ranjan et al. |
| 9,117,009 B2 | 8/2015 | Iizuka et al. |
| 2005/0050086 A1 | 3/2005 | Liu et al. |
| 2013/0290826 A1 | 10/2013 | Niwa et al. |
| 2015/0205917 A1 | 7/2015 | Mabotuwana et al. |

FOREIGN PATENT DOCUMENTS

| | | |
|---|---|---|
| CN | 102037468 A | 4/2011 |
| CN | 102415895 A | 4/2012 |
| CN | 102497805 A | 6/2012 |
| CN | 103281954 A | 9/2013 |
| CN | 104584018 A | 4/2015 |
| JP | 06-251038 A | 9/1994 |
| JP | 2005-025669 A | 1/2005 |
| JP | 4146671 B2 | 9/2008 |
| JP | 2009-082227 A | 4/2009 |
| JP | 2009-086765 A | 4/2009 |
| JP | 2012-118583 A | 6/2012 |
| JP | 2013-132514 A | 7/2013 |
| JP | 2015-156898 A | 9/2015 |

OTHER PUBLICATIONS

Office Action dated May 17, 2019, issued in corresponding International Patent Application No. 2015-190334.

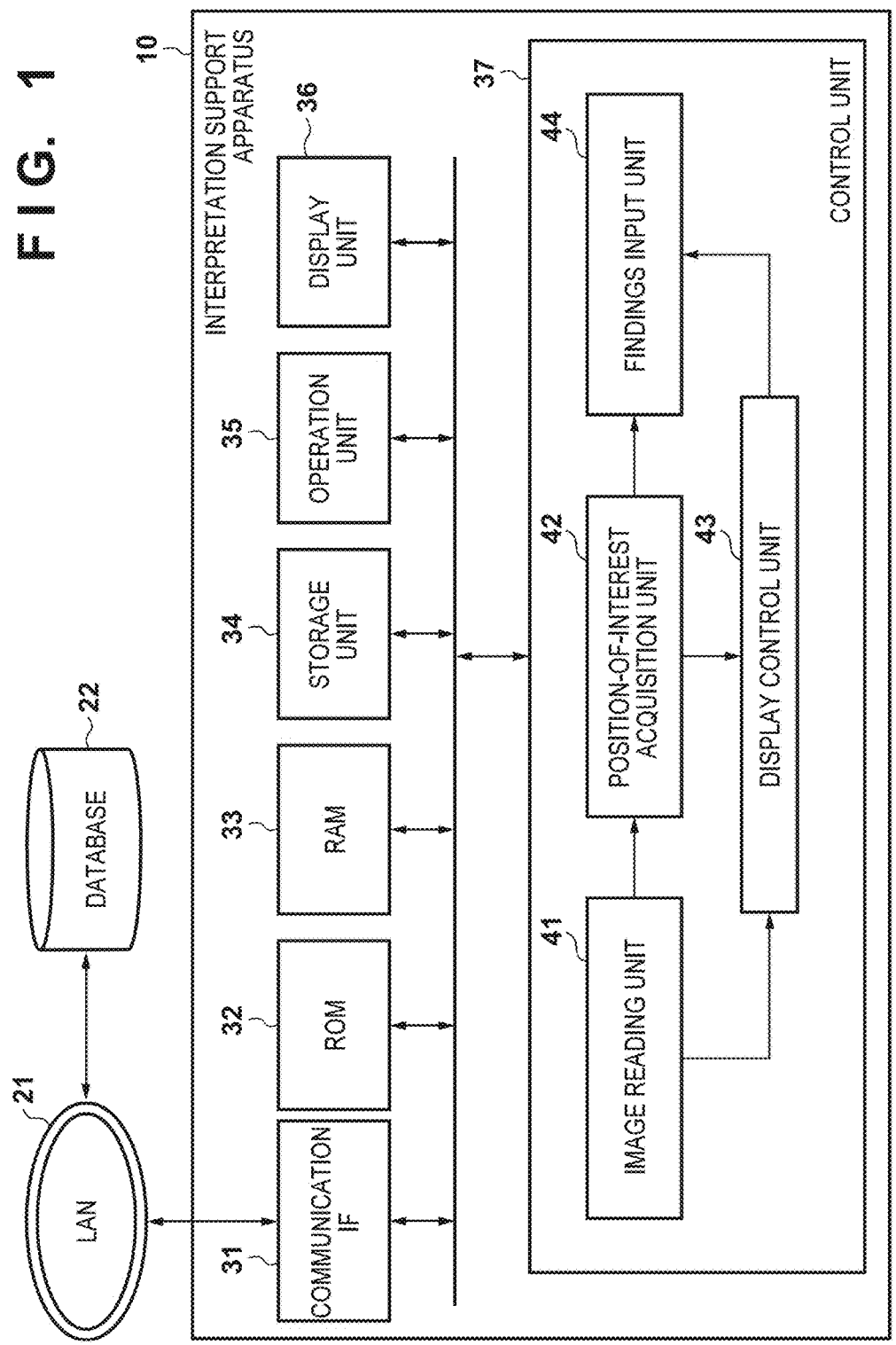

FIG. 3A

| POSITION OF INTEREST (START POINT TO END POINT) 341 | POSITION-OF-INTEREST LABEL 342 | GROUP LABEL 343 | INDIVIDUAL FINDINGS 344 |
|---|---|---|---|
| (382,311,293)-(428,385,320) | PULMONARY NODULE 1 | PULMONARY NODULE GROUP | A SOLID NODULE OF ABOUT 20mm IS OBSERVED IN THE LEFT LOWER LOBE S6, WHICH IS LARGER THAN IN THE PREVIOUS EXAMINATION. |
| (102,185,279)-(162,214,302) | PULMONARY NODULE 2 | PULMONARY NODULE GROUP | ... |
| (089,288,287)-(116,317,308) | PULMONARY NODULE 3 | PULMONARY NODULE GROUP | ... |
| (276,270,277)-(308,307,301) | LYMPH NODE 1 | LYMPH NODE GROUP | ... |
| ... | ... | ... | ... |

FIG. 3B

| GROUP LABEL 345 | GROUP FINDINGS 346 |
|---|---|
| PULMONARY NODULE GROUP | THE SIZE OF NODULE HAS INCREASED AS A WHOLE. NO PLEURAL TAG IS OBSERVED. |
| LYMPH NODE GROUP | ... |
| ... | ... |

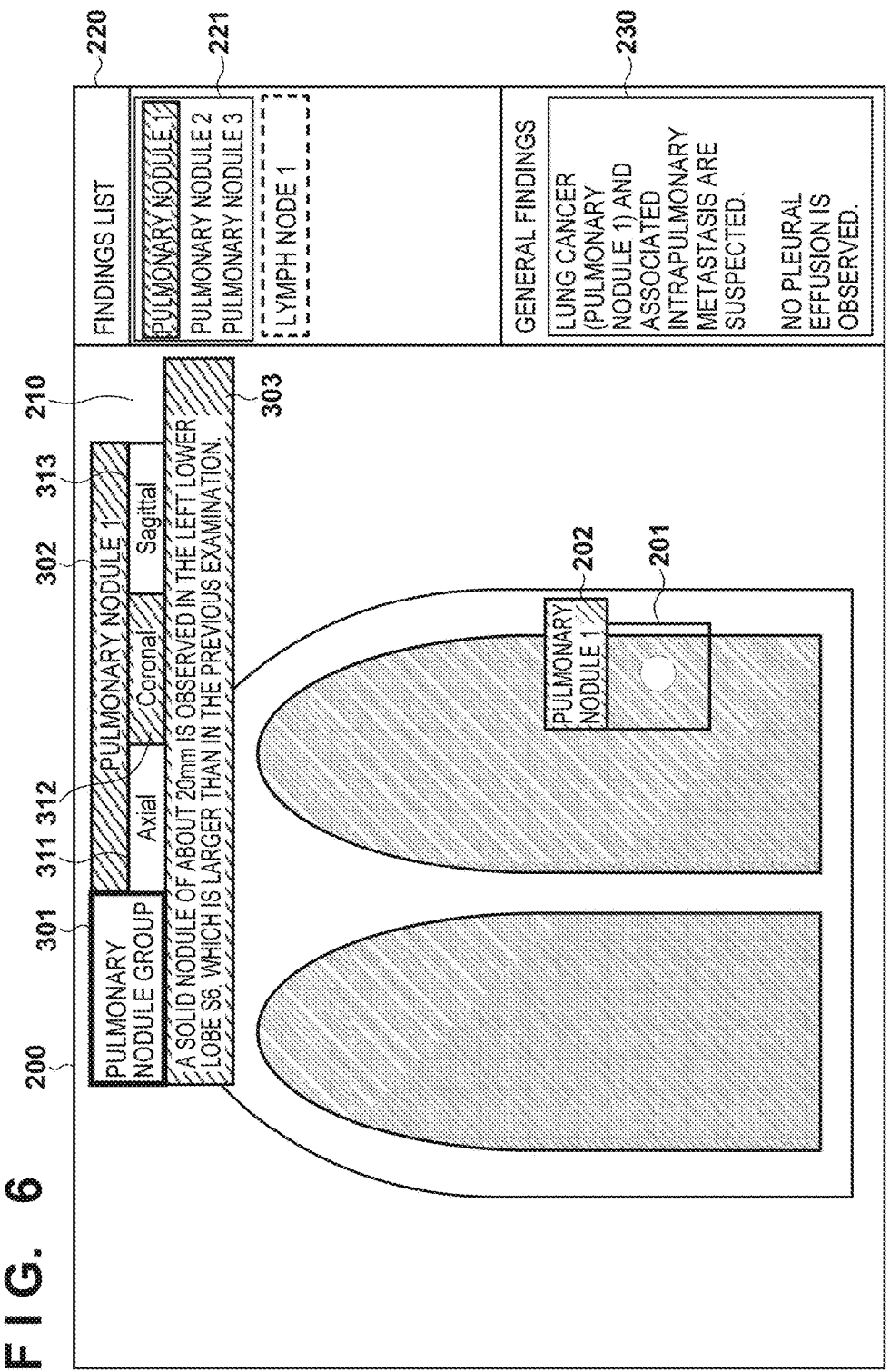

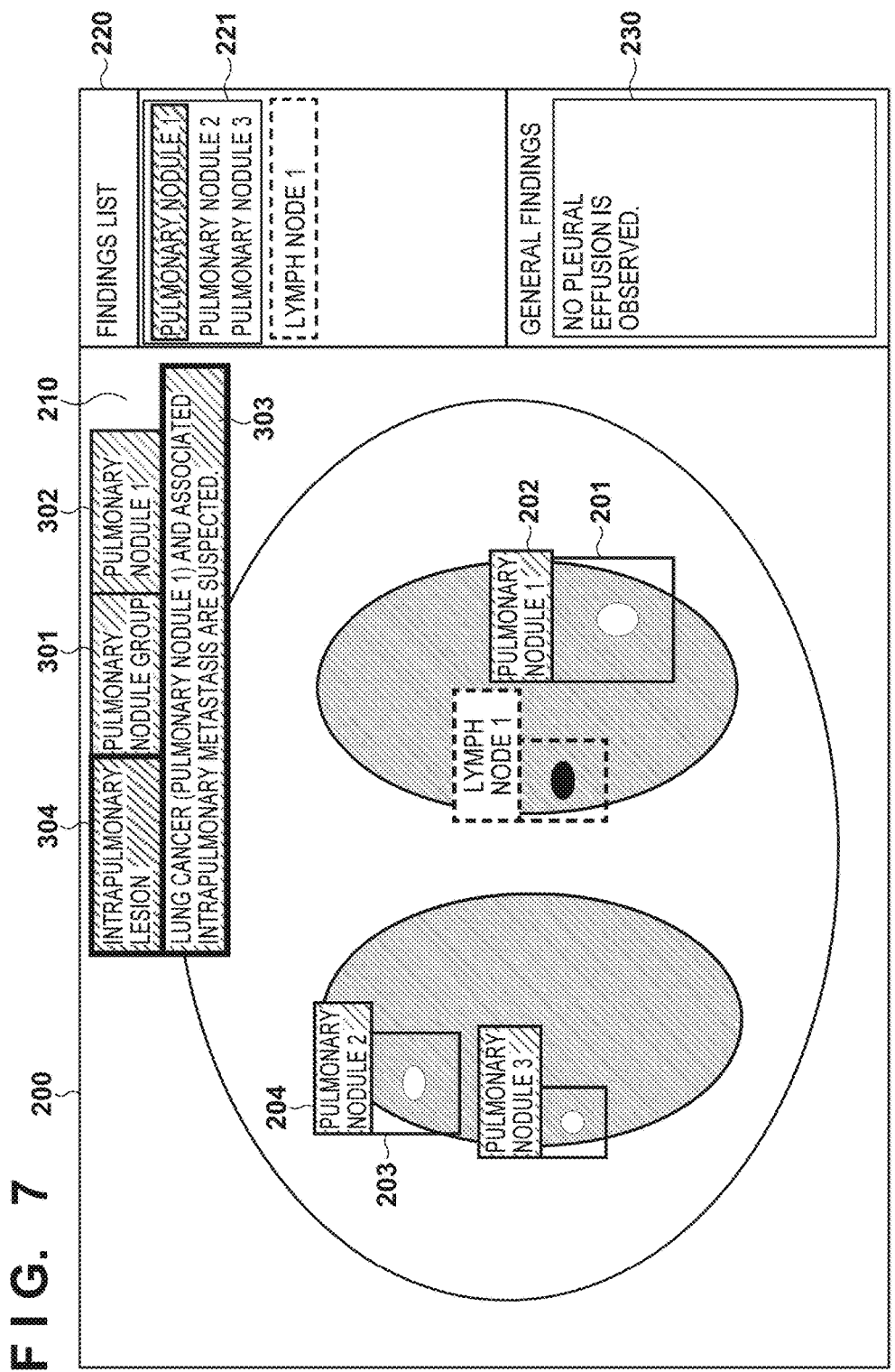

F I G. 8A

| 351 | 352 | 353 | 354 |
|---|---|---|---|
| POSITION OF INTEREST (START POINT TO END POINT) | POSITION-OF-INTEREST LABEL | FIRST LAYER GROUP LABEL | INDIVIDUAL FINDINGS |
| (382,311,293)- (428,385,320) | PULMONARY NODULE 1 | PULMONARY NODULE GROUP | A SOLID NODULE OF ABOUT 20mm IS OBSERVED IN THE LEFT LOWER LOBE S6, WHICH IS LARGER THAN IN THE PREVIOUS EXAMINATION. |
| (102,185,279)- (162,214,302) | PULMONARY NODULE 2 | PULMONARY NODULE GROUP | ... |
| (089,288,287)- (116,317,308) | PULMONARY NODULE 3 | PULMONARY NODULE GROUP | ... |
| (276,270,277)- (308,307,301) | LYMPH NODE 1 | LYMPH NODE GROUP | ... |
| ... | ... | ... | ... |

F I G. 8B

| FIRST LAYER GROUP LABEL (355) | SECOND LAYER GROUP LABEL (356) | FIRST LAYER GROUP FINDINGS (357) |
|---|---|---|
| PULMONARY NODULE GROUP | INTRAPULMONARY LESION | THE SIZE OF NODULE HAS INCREASED AS A WHOLE. NO PLEURAL TAG IS OBSERVED. |
| LYMPH NODE GROUP | INTRAPULMONARY LESION | ... |
| ... | ... | ... |

F I G. 8C

| SECOND LAYER GROUP LABEL (358) | SECOND LAYER GROUP FINDINGS (359) |
|---|---|
| INTRAPULMONARY LESION | LUNG CANCER (PULMONARY NODULE 1) AND ASSOCIATED INTRAPULMONARY METASTASIS ARE SUSPECTED. |
| ... | ... |

INFORMATION PROCESSING APPARATUS TO DISPLAY AN INDIVIDUAL INPUT REGION FOR INDIVIDUAL FINDINGS AND A GROUP INPUT REGION FOR GROUP FINDINGS

CLAIM TO PRIORITY

This application claims the benefit of Japanese Patent Application No. 2015-190334, filed on Sep. 28, 2015, which is hereby incorporated by reference herein in its entirety.

BACKGROUND OF THE INVENTION

Field of the Invention

The present invention relates to an information processing apparatus, an information processing method, an information processing system, and a computer-readable storage medium and, more particularly, to a technique of supporting interpretation of a medical image.

Description of the Related Art

The recent progress of computerization of medical services is leading to a growth in handling both medical image data and interpretation report data as digital data when a doctor interprets medical image data and creates an interpretation report. In a digitized medical system, a medical image display apparatus reads out medical image data saved as digital data and displays it on a monitor. An interpretation report is created using an interpretation creation apparatus and saved as digital data. In such a system, a doctor often makes an interpretation according to a procedure of viewing a medical image displayed on a monitor, and simultaneously, inputting character information of findings or a diagnosis on a report creation screen displayed on another monitor.

Japanese Patent Laid-Open No. 2005-25669 describes an image database system that associates a body part of interest of a medical image with findings data corresponding to the body part of interest. According to this arrangement, when a doctor designates a position on an interpretation target image, a findings input template is displayed at the designated position. Hence, the doctor can input findings information near the body part of interest on the image, while viewing the body part of interest. In addition, when another doctor views the medical image and the interpretation report, the correspondence between the findings and the body part of interest on the image is clear.

In the arrangement of the device in Japanese Patent Laid-Open No. 2005-25669, however, since one findings information is input in correspondence with one designated position, it is impossible to input findings information common to a plurality of positions of interest. On a clinical site, if a patient has multiple lesions, such as metastasis of cancer, a doctor wants to input the same findings (a findings information common of the lesions) in correspondence with the plurality of positions of interest (the multiple lesions). In the arrangement of the device in Japanese Patent Laid-Open No. 2005-25669, however, the same findings information needs to be input repetitively for each of the plurality of positions of interest, and the interpretation operation efficiency lowers. On the other hand, in a conventional interpretation report that does not associate a position on an image with findings, a findings information common to a plurality of positions of interest can be input. However, the correspondence between the findings information and the positions of interest is unclear. It is, therefore, difficult to implement findings input that clearly shows the correspondence between a findings information and a position of interest on an image and does not lower the interpretation efficiency of a doctor.

SUMMARY OF THE INVENTION

The present invention has been made in consideration of the above problem, and provides a technique capable of clearly showing the correspondence between findings information and a position of interest on an image, and inputting a findings information common to a plurality of positions of interest.

According to one aspect, the present invention provides an information processing apparatus that includes a region acquisition unit adapted to acquire a plurality of regions of interest on a medical image of an object to be examined, a designation unit adapted to designate regions of interest to be included in the same group out of the plurality of regions of interest, and a display control unit adapted to cause a display unit to display an individual input region used to input individual findings information for each of the plurality of regions of interest and a common input region used to input findings information common to the regions of interest included in the group.

According to another aspect, the present invention provides an information processing apparatus that includes an individual findings acquisition unit adapted to acquire individual findings information for each of a plurality of regions of interest on a medical image of an object to be examined, a designation unit adapted to designate regions of interest to be included in the same group out of the plurality of regions of interest, a common findings acquisition unit adapted to acquire findings information common to the regions of interest included in the group, and an association unit adapted to associate the individual findings information with the common findings information for each of the regions of interest included in the group.

According to still another, the present invention provides an information processing apparatus that includes a region acquisition unit adapted to acquire a plurality of regions of interest on a medical image of an object to be examined, a designation unit adapted to designate regions of interest to be included in the same group out of the plurality of regions of interest, and a display control unit adapted to cause a display unit to display a common input region used to input findings information common to the regions of interest included in the group.

According to yet another aspect, the present invention provides an information processing system that includes a region acquisition unit adapted to acquire a plurality of regions of interest on a medical image of an object to be examined, a designation unit adapted to designate regions of interest to be included in the same group out of the plurality of regions of interest, and a display control unit adapted to cause a display unit to display an individual input region used to input individual findings information for each of the plurality of regions of interest and a common input region used to input findings information common to the regions of interest included in the group.

According to still yet another aspect, the present invention provides an information processing system that includes an individual findings acquisition unit adapted to acquire individual findings information for each of a plurality of regions of interest on a medical image of an object to be examined, a designation unit adapted to designate regions of interest to be included in the same group out of the plurality of regions of interest, a common findings acquisition unit adapted to acquire findings information common to the regions of interest included in the group, and an association unit adapted to associate the individual findings information with the common findings information for each of the regions of interest included in the group.

According to yet still another aspect, the present invention provides an information processing system that includes a region acquisition unit adapted to acquire a plurality of regions of interest on a medical image of an object to be examined, a designation unit adapted to designate regions of interest to be included in the same group out of the plurality of regions of interest, and a display control unit adapted to cause a display unit to display a common input region used to input findings information common to the regions of interest included in the group.

According to still yet another aspect, the present invention provides an information processing method that includes acquiring, by a region acquisition unit, a plurality of regions of interest on a medical image of an object to be examined, designating, by a designation unit, regions of interest to be included in the same group out of the plurality of regions of interest, and causing, by a display control unit, a display unit to display an individual input region used to input individual findings information for each of the plurality of regions of interest and a common input region used to input findings information common to the regions of interest included in the group.

According to yet still another aspect, the present invention provides an information processing method that includes, acquiring, by an individual findings acquisition unit, individual findings information for each of a plurality of regions of interest on a medical image of an object to be examined, designating, by a designation unit, regions of interest to be included in the same group out of the plurality of regions of interest, acquiring, by a common findings acquisition unit, findings information common to the regions of interest included in the group, and associating, by an association unit, the individual findings information with the common findings information for each of the regions of interest included in the group.

According to still yet another aspect, the present invention an information processing method that includes acquiring, by a region acquisition unit, a plurality of regions of interest on a medical image of an object to be examined, designating, by a designation unit, regions of interest to be included in the same group out of the plurality of regions of interest, and causing, by a display control unit, a display unit to display a common input region used to input findings information common to the regions of interest included in the group.

Further features of the present invention will become apparent from the following description of exemplary embodiments (with reference to the attached drawings).

BRIEF DESCRIPTION OF THE DRAWINGS

FIG. 1 is a block diagram showing the overall arrangement of an interpretation support system including an interpretation support apparatus.

FIGS. 3A and 3B are views showing examples of position-of-interest information and group information.

FIG. 6 is a view showing a display example of a screen on which an individual findings input field and a group findings input field are arranged.

FIG. 7 is a view showing a display example of a screen on which an individual findings input field and a group findings input field are arranged.

FIGS. 8A, 8B, and 8C are views showing examples of position-of-interest information and hierarchical group information.

DESCRIPTION OF THE PREFERRED EMBODIMENTS

Figure 2A:
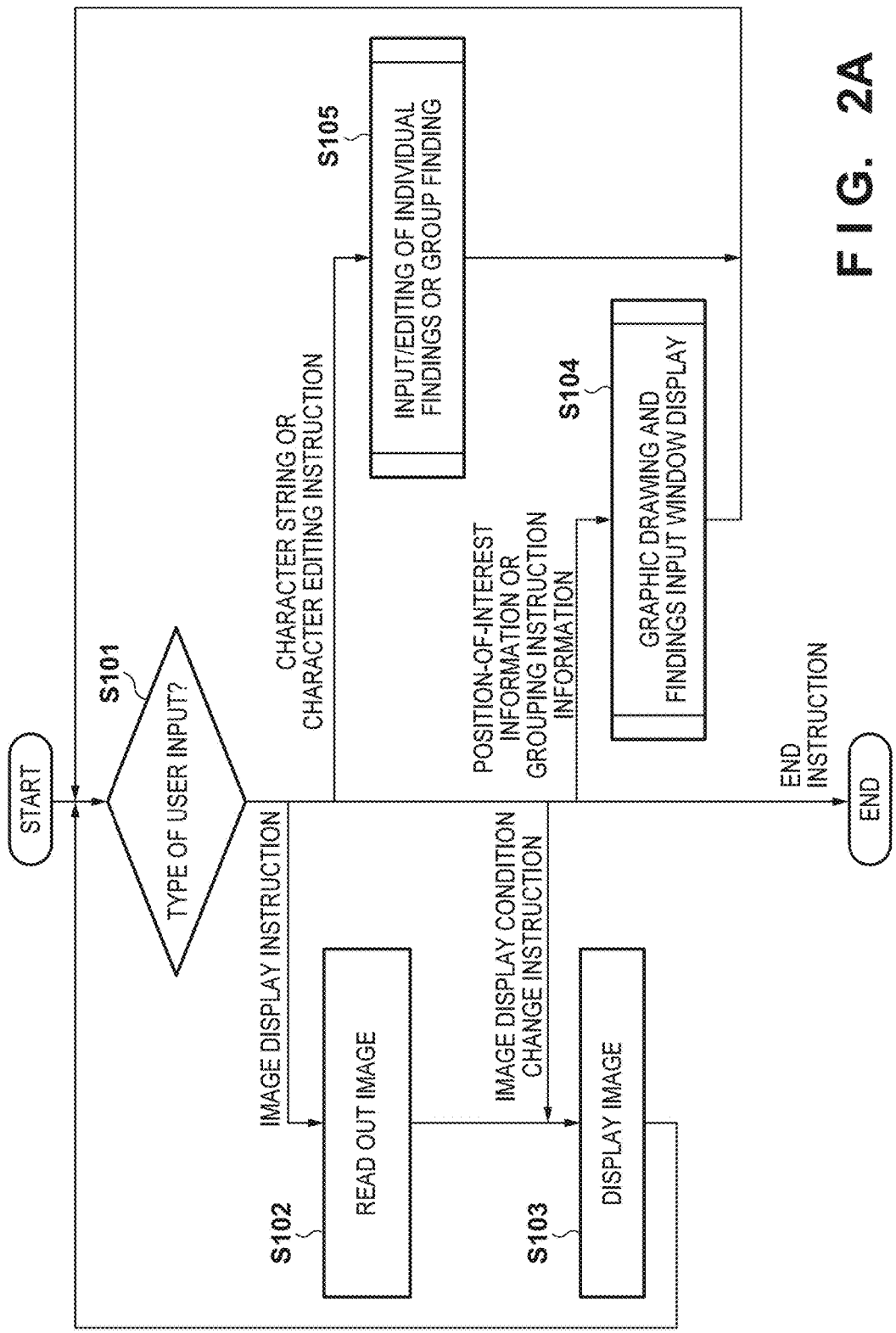
FIG. 2A is a flowchart showing the processing procedure of the interpretation support system.

Embodiments of the present invention will now be described with reference to the accompanying drawings. Note that the technical scope of the present invention is not limited to the following arrangement examples.

An interpretation support apparatus according to any embodiment of the present invention acquires medical information (e.g., a medical image or electronic medical record information) associated with a case as a diagnosis target or input information from a user, and performs diagnosis support associated with the case. A description will be made below using an example in which three-dimensional medical image data formed from a plurality of tomographic images is handled. However, the interpretation support target is not limited to this, and the embodiment can be applied when interpreting arbitrary image data. The embodiment to be described below is merely an example used to explain the processing of the interpretation support apparatus.

(Interpretation Support System)

FIG. 1 is a block diagram showing the overall arrangement of an interpretation support system (information processing system) including an interpretation support apparatus (information processing apparatus) according to this embodiment. The interpretation support system includes an interpretation support apparatus 10 and a database 22. These apparatuses are connected to each other via a communication apparatus 21. In this embodiment, an example in which the communication apparatus 21 is formed from a LAN (Local Area Network) will be described. However, the communication apparatus 21 may be formed from a wireless communication apparatus (wireless LAN, or the like) or a public communication network. The database 22 manages data such as a medical image. The interpretation support apparatus 10 acquires a medical image managed by the database 22 via the LAN 21.

The interpretation support apparatus 10 includes, as its functional components, a communication IF (interface) 31, a ROM (Read Only Memory) 32, a RAM (Random Access Memory) 33, a storage unit 34, an operation unit 35, a display unit 36, and a control unit 37. The communication IF 31 is implemented by, for example, a LAN card, and control communication between the interpretation support apparatus 10 and an external apparatus (for example, the database 22) via the LAN 21. The ROM 32 is a read only memory implemented by a nonvolatile memory, or the like, and stores various kinds of computer programs. The RAM 33 is a writable memory implemented by a volatile memory, or the like, and temporarily stores various kinds of information. The storage unit 34 is a storage device implemented by, for example, an HDD (Hard Disk Drive), and stores various kinds of information. The operation unit 35 is implemented by, for example, a keyboard or a pointing device, and inputs a user instruction to the apparatus. The display unit 36 is implemented by, for example, a display, and displays various kinds of information to the user. The control unit 37 is implemented by, for example, a CPU (Central Processing Unit), and generally controls processing in the interpretation support apparatus 10.

The control unit 37 includes, as its functional components, an image reading unit 41, a position-of-interest acquisition unit 42, a display control unit 43, and a findings input unit 44. The functions of the units in the control unit 37 will be described in association with the flowcharts of FIGS. 2A, 2B, and 2C. These functions are implemented when the control unit 37 controls the interpretation support apparatus 10 based on a computer program. The interpretation support apparatus 10 can be formed from a general-purpose information processing apparatus, such as a personal computer (PC), a workstation (WS), or a tablet terminal.

Processing Procedure)

Overall Processing

Figure 2B:
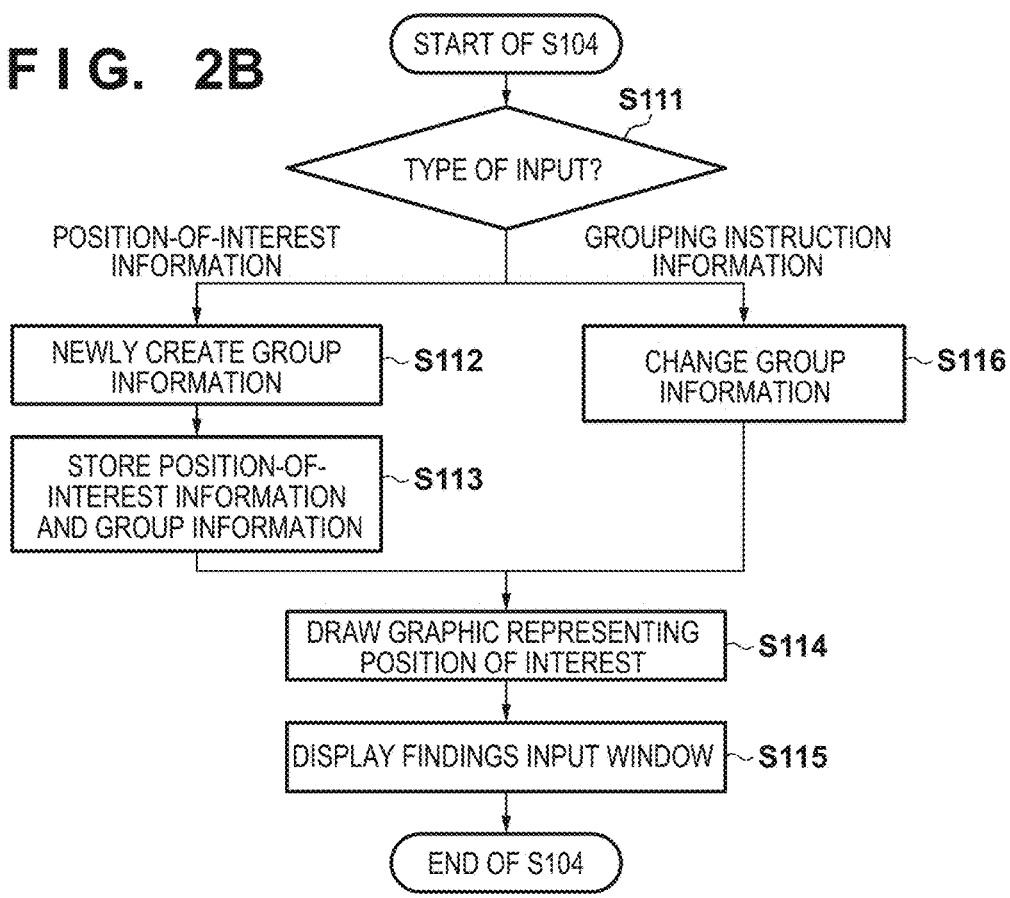
FIG. 2B is a flowchart showing the processing procedure of the interpretation support system.
Figure 2C:
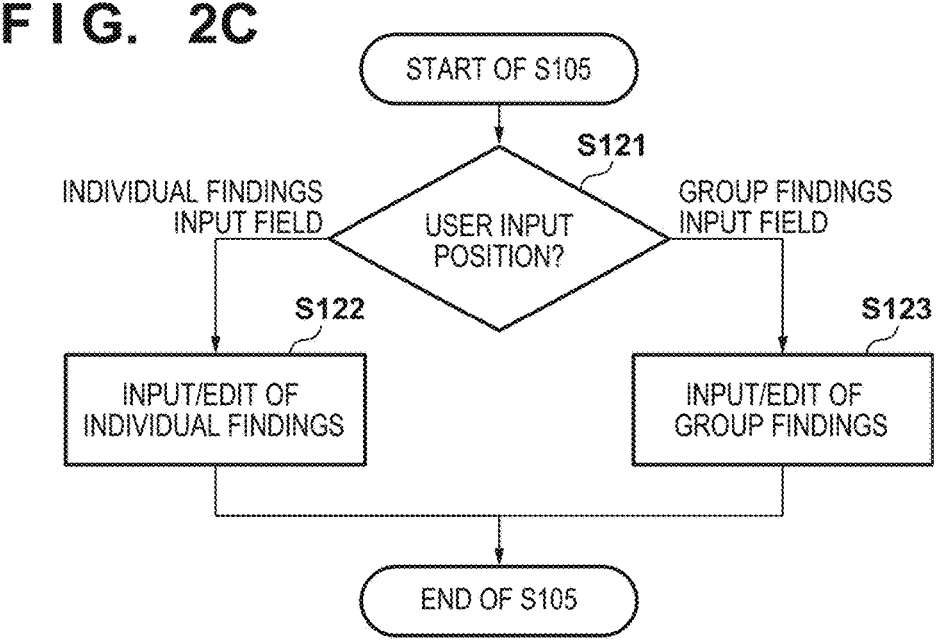
FIG. 2C is a flowchart showing the processing procedure of the interpretation support system.

FIGS. 2A, 2B, and 2C are flowcharts showing a processing procedure according to this embodiment, which is implemented by the control unit 37 of the interpretation support apparatus 10. In step S101 of FIG. 2A, the control unit 37 decides processing to be executed next in accordance with the type of a user input from the operation unit 35. If the user input is an image display instruction, the process advances to step S102. If the user input is an image display condition change instruction, the process advances to step S103. If the user input is position-of-interest information or grouping instruction information, the process advances to step S104. If the user input is a character string or a character editing instruction, the process advances to step S105. However, step S103 becomes executable only after step S102 is executed at least once. In addition, step S104 becomes executable only after step S103 is executed at least once. In addition, step S105 becomes executable only after step S104 is executed at least once. If an end instruction is input in step S101, the processing ends.

In step S102, based on the user input (image display instruction) from the operation unit 35, the image reading unit 41 reads out three-dimensional image data from the database 22 via the communication IF 31 and the LAN 21, and stores it in the storage unit 34. In step S102, the image reading unit 41 also outputs the information of the storage location of each tomographic image included in the three-dimensional image data stored in the storage unit 34 and the attribute information of each tomographic image to the display control unit 43. The process then advances to step S103.

In step S103, based on the user input (an image display instruction or an image display condition change instruction) from the operation unit 35, the display control unit 43 selects a tomographic image to be displayed and decides image display conditions. The display control unit 43 also displays the selected tomographic image on the display unit 36 in accordance with the decided image display conditions. Here, the image display conditions include the display area information of the image on the display unit 36, the display position information of the image in the display area, the enlargement/reduction ratio of the image, the presence/absence of mirror reversing of the image in the horizontal or vertical direction, the rotation angle of the image, and density conversion of the image. The process then returns to step S101.

In step S104, based on the user input (position-of-interest information or grouping instruction information) from the operation unit 35, the control unit 37 draws a graphic representing a position of interest, and displays a findings input window corresponding to the position of interest. Details of the control procedure of step S104 will be described later with reference to FIG. 2B. When the processing of step S104 ends, the process returns to step S101.

In step S105, based on the user input (a character string or a character editing instruction) from the operation unit 35, the control unit 37 inputs or edits individual findings, or inputs or edits group findings. Details of the control procedure of step S105 will be described later with reference to FIG. 2C. When the processing of step S105 ends, the process returns to step S101.

Drawing of Graphic and Display of Findings Input Window

FIG. 2B is a flowchart showing details of the control procedure of step S104. In step S104, the control unit 37 acquires a plurality of regions of interest in a medical image of an object to be examined (region acquisition), and designates regions to be included in the same group out of the plurality of regions of interest. The control unit 37 also causes the display unit 36 to display an individual findings input field used to input individual findings information for each of the plurality of regions of interest and a group findings input field used to input findings information common to the regions of interest included in the group.

In step S111, the control unit 37 decides processing to be executed next in accordance with the type of a user input from the operation unit 35. If the user input is position-of-interest information, the process advances to step S112. If the user input is a change of group information, the process advances to step S116. Note that step S101 in FIG. 2A and step S111 in FIG. 2B are separately illustrated to facilitate understanding. However, when executing step S101, step S111 may simultaneously be executed.

Note that position-of-interest information (region of interest) according to this embodiment is coordinate information representing one point or a predetermined range on the tomographic image displayed on the display unit 36. The predetermined range means a two-dimensional range on a tomographic image or a three-dimensional range on a three-dimensional image designated by a plurality of pieces of coordinate information input by the user. As a general range designation method, for example, the user designates two points on the tomographic image displayed on the display unit 36 using the pointing device provided on the operation unit 35, thereby designating a rectangular rang or an elliptical range. In addition, the user designates a slice range (a slice start position and a slice end position) that enables the designated rectangular range, thereby designating a rectangular parallelepiped range on the three-dimensional image. Alternatively, the user designates, on each of two cross section images out of three orthogonal cross section images, a rectangular range indicating a different cross section of one rectangular parallelepiped, thereby designating a rectangular parallelepiped range on the three-dimensional image. Range designation is not limited to those described above, and can be done by an arbitrary method.

In step S112, the position-of-interest acquisition unit 42 serving as a region acquisition unit newly creates group information corresponding to the position-of-interest information input by the user. The group information creation method will be described later with reference to FIGS. 3A and 3B.

In step S113, the position-of-interest acquisition unit 42 stores the position-of-interest information input by the user and the group information corresponding to it in the storage unit 34 in association with each other. Details of the types of information stored here and details of the storage method will be described later with reference to FIGS. 3A and 3B. The process then advances to step S114.

In step S114, the position-of-interest acquisition unit 42 outputs the position-of-interest information and information (group information) associated with it to the display control unit 43. Based on the information received from the position-of-interest acquisition unit 42, the display control unit 43 draws a graphic representing the position of interest on the tomographic image displayed on the display unit 36. At this time, the position-of-interest acquisition unit 42 stores a position-of-interest label input by the user in the storage unit 34 and also outputs it to the display control unit 43, as will be described later with reference to FIGS. 3A, 3B, and 4. The display control unit 43 updates the information displayed on the display unit 36 using the received position-of-interest label.

In step S115, based on the information received from the position-of-interest acquisition unit 42, the display control unit 43 displays a findings input window at a predetermined position in the tomographic image display area (or outside of the tomographic image display area) displayed on the display unit 36. Here, an individual findings input field (individual input region) used to input findings for the position of interest and a group findings input field (common input region) used to input findings for the group are displayed on the findings input window in parallel or to be switchable. Screen display examples of the findings input window will be described later with reference to FIGS. 4 to 9. When the processing of step S115 ends, the process returns to step S101 in FIG. 2A.

On the other hand, in step S116, based on the grouping instruction information input by the user, the position-of-interest acquisition unit 42 updates the group information stored in the storage unit 34 in step S113. The grouping instruction information includes information representing which position-of-interest information is included in the same group as which position-of-interest information. For example, when the user drags and drops a graphic representing an arbitrary position of interest displayed on the display unit 36 onto a graphic representing another position of interest using the pointing device provided on the operation unit 35, thereby obtaining grouping instruction information. In this example, a group label corresponding to the position of interest representing the graphic of the drag source is rewritten by a group label corresponding to the position of interest represented by the graphic of the drop destination so that the two regions of interest belong to the same group. When the processing of step S116 ends, the display is changed based on the changed group information, in steps S114 and S115. The process then returns to step S101 in FIG. 2A.

Input/Editing of Individual Findings or Group Findings

FIG. 2C is a flowchart showing details of the control procedure of step S105. In step S105, processing, of acquiring individual findings information for each region of interest or findings information common to the regions of interest included in the same group (individual findings acquisition or common findings acquisition) and causing the display unit 36 to display the information, is performed.

In step S121, the findings input unit 44 decides processing to be executed next in accordance with the input position of the user input (a character string or a character editing instruction) from the operation unit 35. If the user input position is located in the individual findings input field of the findings input window, in step S122, the character string input by the user is added to the individual findings input field. Alternatively, in step S122, editing (cut and paste, deletion, or the like) of an already input character string is performed based on the character editing instruction input by the user. On the other hand, if the user input position is located in the group findings input field of the findings input window, in step S123, the character string input by the user is added to the group findings input field. Alternatively, in step S123, editing of an already input character string is performed based on the character editing instruction input by the user.

Note that the user can move the character string already input to the individual findings input field to a corresponding group findings input field by inputting the above-described character editing instruction. Conversely, the user can also move the character string already input to the group findings input field to a corresponding individual findings input field. The operation method will be described later with reference to FIG. 4.

The procedure of allowing the user to input a character string to the individual findings input field or the group findings input field any time has been described above. On the other hand, the findings input unit 44 may be inhibited from inputting a character string to the individual findings input field or the group findings input field until predetermined conditions are met, as will be described below. For example, as information included in the above-described group information, there exist a position-of-interest label (a label used to identify a specific position of interest or an individual findings information corresponding to the position of interest) and a group label (a label used to identify a specific group) to be described later with reference to FIGS. 3A and 3B. The findings input unit 44 may be inhibited from inputting a character string to the individual findings input field until the position-of-interest label is input. In addition, the findings input unit 44 may be inhibited from inputting a character string to the group findings input field until the group label is input.

When the processing of step S122 or S123 ends, the processing of step S105 ends.

Group Information)

FIGS. 3A and 3B are views showing, using a table format, examples of the storage methods of the position-of-interest information stored in the storage unit 34 in step S113 and the corresponding group information. The first row of FIG. 3A shows an explanation of the type of stored information. However, the first row need not be stored in a case in which pieces of information are stored in each column in a predetermined order. Here, the explanation of the first row is illustrated to facilitate understanding of the drawing. From the second row, each position-of-interest information and information associated with it are stored.

Reference numeral 341 in FIG. 3A denotes position-of-interest information. FIG. 3A shows an example in which position-of-interest information is designated by a rectangular parallelepiped range. The (X, Y, Z) coordinates of the start point of each rectangular parallelepiped range and the (X, Y, Z) coordinates of the end point are stored. That is, in FIG. 3A, position-of-interest information is designated by a rectangular parallelepiped formed by three planes perpendicular to the X-, Y-, and Z-axes and passing through the start point and three planes perpendicular to the X-, Y-, and Z-axes and passing through the end point.

Reference numeral 342 denotes a position-of-interest label assigned to each position of interest by the user. The interpretation support apparatus 10 causes the user to input a character string from the operation unit 35 using the keyboard, or the like, thereby acquiring the position-of-interest label.

Reference numeral 343 denotes a group label corresponding to each position of interest. In step S112, the position-of-interest acquisition unit 42 creates a new group label. In step S116, the position-of-interest acquisition unit 42 rewrites an existing group label.

Group information is information that combines the position-of-interest label 342 and the group label 343, and represents which position of interest is included in which group. Note that, in step S112, when the position-of-interest acquisition unit 42 creates a new group label 343, character string creation may be inhibited, or an empty character string may be created to set the absence of a group label in the initial state. In this case as well, group information is information that combines the position-of-interest label and the empty group label (the absence of a group label).

The position-of-interest acquisition unit 42 can automatically create the nonempty group label 343 using the position-of-interest label 342. For example, the character string of the position-of-interest label that the position-of-interest acquisition unit 42 receives from the user is limited to a character string formed from an arbitrary character string, other than numbers and a numeric string. At this time, the position-of-interest acquisition unit 42 adds a character string "group" immediately after the character string of the position-of-interest label 342 other than numbers, thereby automatically creating a group label. However, if the automatically created group label 343 already exists, a different group label 343 may be created by, for example, adding a random number or a number (for example, a natural number) that monotonically increases to a predetermined position (immediately before the character string "group") of the group label.

As another method of creating the group label 343, the following method is also usable. That is, the position-of-interest acquisition unit 42 may create a group label by converting the character string of the position-of-interest label other than numbers into another character string, based on a predetermined conversion rule or conversion table and adding the character string "group" immediately after it.

Reference numeral 344 denotes an individual findings information for each position of interest, which is an individual findings information input or edited by the findings input unit 44 in step S122.

FIG. 3B shows an example of the storage method of group findings information for each group. The first row shows an explanation of the type of stored information. The first row is only illustrated to facilitate understanding and need not always be stored. From the second row, a group label and a group findings information for each group are stored. Reference numeral 345 denotes a group label for each group exemplified in FIG. 3A. Reference numeral 346 denotes group findings information for each group, which is a group findings input or edited by the findings input unit 44 in step S123.

As shown in FIG. 3A, the individual findings 344 and the group label 343 are stored in correspondence with each position 341 of interest. As shown in FIG. 3B, the group findings 346 are stored in correspondence with each group label 345. Hence, by searching for the same group label, the display control unit 43 can read out, from the storage unit 34, both the individual findings and the group findings in correspondence with each position of interest. As described above, even if a plurality of positions of interest belonging to the same group exist, only one group findings information is stored for one group. Hence, the user need not input the same character string (group findings) as many times as the number of positions of interest.

As described above, the storage unit 34 stores the identification information of a region of interest and the identification information of a group including the region of interest in association with each other. The storage unit 34 also stores the individual findings information of a region of interest and findings information common to regions of interest included in a group including the region of interest in association with each other. The identification information of a group is stored in the storage unit 34 in association with the identification information of each region of interest, thereby creating a group. In response to addition of a new region of interest to the group, findings information common to the regions of interest included in the group is associated with the identification information of the new region of interest. This makes it possible to manage/use the pieces of information while maintaining the correspondence between a region of interest of a medical image, a group to which the region of interest belongs, and findings information added to each region of interest or group.

Note that an example, in which a plurality of regions of interest included in a medical image are included in some kinds of groups, has been described with reference to FIGS. 3A and 3B. However, each region of interest may not be included in any group. For example, for each of a plurality of regions of interest, whether to include the region of interest in an existing group or in a new group, or not to include the region of interest in any group may be designated. This makes it possible to flexibly input/manage findings in accordance with the state or condition of a disease, a user's intention, or the like.

FIGS. 3A and 3B show an example in which each group includes at least one region of interest. However, a group that does not include any region of interest may exist. For example, a group may be created in advance for each condition or each organ with a disease, and the user may select one of the groups and designate it for each region of interest. This allows the user to more easily designate a group.

Screen Display Example)

Screen display examples of the findings input window will be described below with reference to FIGS. 4 to 9. In this embodiment, a medical image, information representing the position of each of a plurality of regions of interest included in the medical image, and information representing groups to which the plurality of regions of interest belong are displayed.

Figure 4:
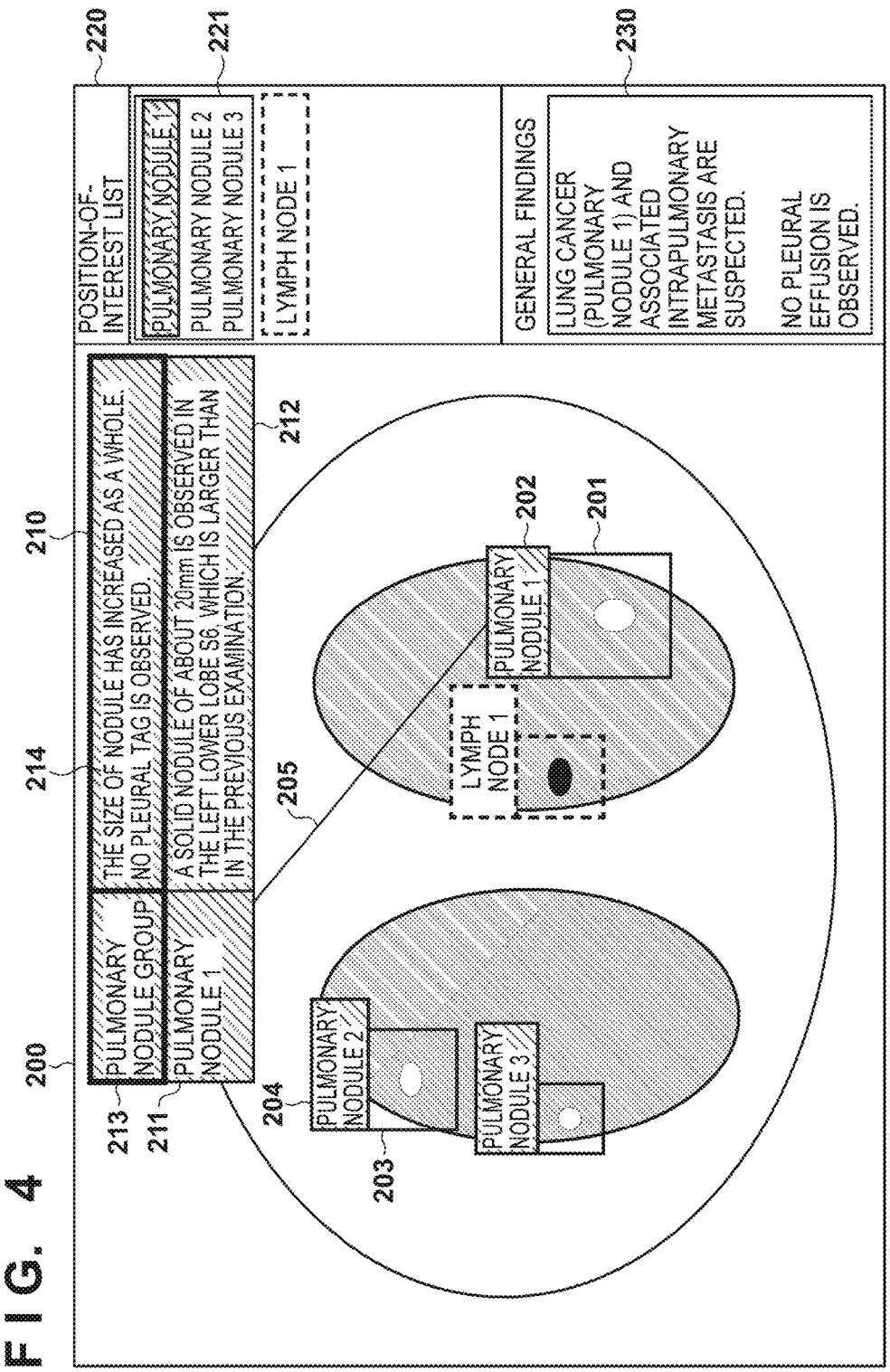
FIG. 4 is a view showing a display example of a screen on which an individual findings input field and a group findings input field are arranged.

FIG. 4 shows a screen display example in a case in which an individual findings input field and a group findings input field are arranged in parallel in the findings input window. By steps S102 and S103 described above, a tomographic image is displayed in an image display area 200. By step S114 described above, graphics (rectangles) 201 and 203, and the like, each representing a position of interest are drawn. A character string display frame 202 used to display the position-of-interest label described with reference to FIG. 3A is displayed at a position adjacent to the graphic 201. Similarly, a character string display frame 204 used to display a position-of-interest label is displayed at a position adjacent to the graphic 203. For each of graphics representing other positions of interest as well, a character string display frame used to display a position-of-interest label is displayed at an adjacent position. The character string in each character string display frame can be edited. The user inputs a position-of-interest label to the character string display frame using the keyboard, or the like, of the operation unit 35. In addition, the display control unit 43 may display a plurality of predetermined position-of-interest label candidates on the display unit 36, and the user may select one of the position-of-interest label candidates to input/acquire the selected position-of-interest label in the character string display frame.

The display forms (the line type, color, and thickness of a frame) of the graphics 201 and 203, each representing a position of interest and those of the character string display frames 202 and 204, each used to display a position-of-interest label, are similarly set for each group. This allows the user to easily recognize positions of interest belonging to the same group only by comparing the display forms of the graphics.

An individual findings input field 212 and a group findings input field 214 are displayed in parallel (arranged vertically) in a findings input window 210. In the example of FIG. 4, a position-of-interest label display field 211 is displayed on the left side of the individual findings input field 212, and a group label display field 213 is displayed on the left side of the group findings input field 214. The labels 211 and 213 and the findings 212 and 214 are displayed at adjacent positions (arranged horizontally) such that the correspondence among the graphic 201 representing a position of interest, the individual findings input field 212, and the group findings input field 214 becomes clear. Alternatively, to explicitly show the region of interest for which the findings input window 210 is currently displaying findings information, a line 205 that connects the graphic 201 (and the character string display frame 202) and the findings input window 210 may be displayed. Some of the display forms of the graphic 201 and the findings input window 210 may be changed to display forms different from those set for each group, thereby explicitly indicating that editing is progressing. In addition, to explicitly show findings information under editing, one (a field under editing) of the individual findings input field 212 and the group findings input field 214 may be changed to a display form indicating that editing is progressing.

The position and size (the lengths in the vertical and horizontal directions) of the findings input window 210 can be changed by a user instruction from the operation unit 35. For example, in the initial state, the findings input window 210 is displayed in a predetermined size at a predetermined position (for example, at the upper right corner) in the image display area 200. After that, the findings input window 210 may be displayed outside of the image display area 200, or in a different size in accordance with a user instruction. The position and size to display the findings input window 210 may be stored in the storage unit 34, and, in the next screen display, the findings input window 210 may be displayed on the display unit 36 using the position and size stored in the storage unit 34.

By step S122 described above, input or editing of the character string (individual findings) in the individual findings input field 212 can be performed. By step S123 described above, input or editing of the character string (group findings) in the group findings input field 214 can be performed. In addition, processing of determining whether the user input position is located in the position-of-interest label display field 211 or the group label display field 213 may be added to the determination of step S121 described above. When this processing is added, the position-of-interest label or group label can also be edited in accordance with the same procedure as in step S122 or step S123. Note that to prevent assignment of a wrong group label, as for the editing of a group label, an editing method of selecting one of existing group labels may be used. Alternatively, the user may drag and drop a graphic representing a position of interest onto another graphic using the pointing device, thereby showing that the two positions of interest belong to the same group. More specifically, when the user drags and drops the graphic 203 onto the graphic 201, the findings input unit 44 changes the group label of pulmonary nodule 2 to the same group label as that of pulmonary nodule 1. At this time, the display control unit 43 changes the display attributes of the graphic representing pulmonary nodule 2 to display attributes corresponding to the group after the change without changing the drawing position of each graphic.

The same position-of-interest label ("pulmonary nodule 1") is displayed in the character string display frame 202 and the position-of-interest label display field 211. As shown in FIG. 3A, one position-of-interest label is stored in one storage area in the storage unit 34. Hence, the display in the character string display frame 202 and that in the position-of-interest label display field 211 are always the same.

An arbitrary character string in the individual findings input field 212 can be copied or moved to an arbitrary position in the group findings input field 214 in accordance with a user instruction from the operation unit 35. Reversely, an arbitrary character string in the group findings input field 214 can be copied or moved to an arbitrary position in the individual findings input field 212 in accordance with a user instruction from the operation unit 35. More specifically, the user selects an arbitrary character string in the individual findings input field 212 using the pointing device or the keyboard, and after that, inputs a cut (delete and copy) or copy instruction. After that, the user moves the cursor to an arbitrary position of the character string in the group findings input field 214 using the pointing device or the keyboard, and after that, inputs a paste (insertion of the copied character string) instruction, thereby completing the copy or movement of the character string. Alternatively, the whole character string in the individual findings input field 212 may be copied or moved to the top or end of the character string in the group findings input field 214 by a predetermined general user interface (GUI) operation (pressing of a button or pressing of a key). Reversely, the whole character string in the group findings input field 214 may be copied or moved to the top or end of the character string in the individual findings input field 212 by a predetermined GUI operation.

In a position-of-interest list display area 220, the list of position-of-interest labels corresponding to all positions of interest set on an arbitrary tomographic image of three-dimensional medical image data as an interpretation target is displayed. In the position-of-interest list, position-of-interest labels belonging to the same group are continuously displayed, and a frame 221 enclosing all of the position-of-interest labels belonging to the same group is displayed. The display attributes (character color, background color, and the like) of the position-of-interest labels may be set to different values on a group basis. If one of the position-of-interest labels displayed in the position-of-interest list display area 220 is selected by a user input from the operation unit 35, the display control unit 43 may display, in the image display area 200, the tomographic image on which the selected position of interest exists. That is, only by selecting a display item (position-of-interest label) in the position-of-interest list display area 220, the user can observe a tomographic image on which the corresponding position of interest exists. Hence, the user can very efficiently review the tomographic image.

In a general findings input area 230, the user freely inputs findings information that is neither included in individual findings nor in group findings, a diagnosis, a treatment method, and the like.

As described above, in this embodiment, the display unit 36 is caused to display, not only the individual findings input field used to input individual findings information for each of a plurality of regions of interest, but also, the group findings input field used to input findings information common to regions of interest included in a group. It is, therefore, possible to clearly show the correspondence between findings information and each of positions of interest on an image, and also, to input group findings information common to a plurality of positions of interest, and thus, improve the interpretation efficiency.

Additionally, in this embodiment, the display unit 36 is caused to display the individual findings input field and the group findings input field separately. The display unit 36 is also caused to in parallel display the individual findings input field and the group findings input field. For this reason, the user can easily discriminate between the individual findings input field and the group findings input field and input or browse a findings information.

Note that, in this embodiment, an example in which the individual input region and the common input region are displayed has been described. However, only the common input region may be displayed without displaying the individual input region. Since this arrangement also allows the user to easily input findings information common to a plurality of regions of interest in association with the regions of interest, the interpretation efficiency can be improved.

Figure 5:
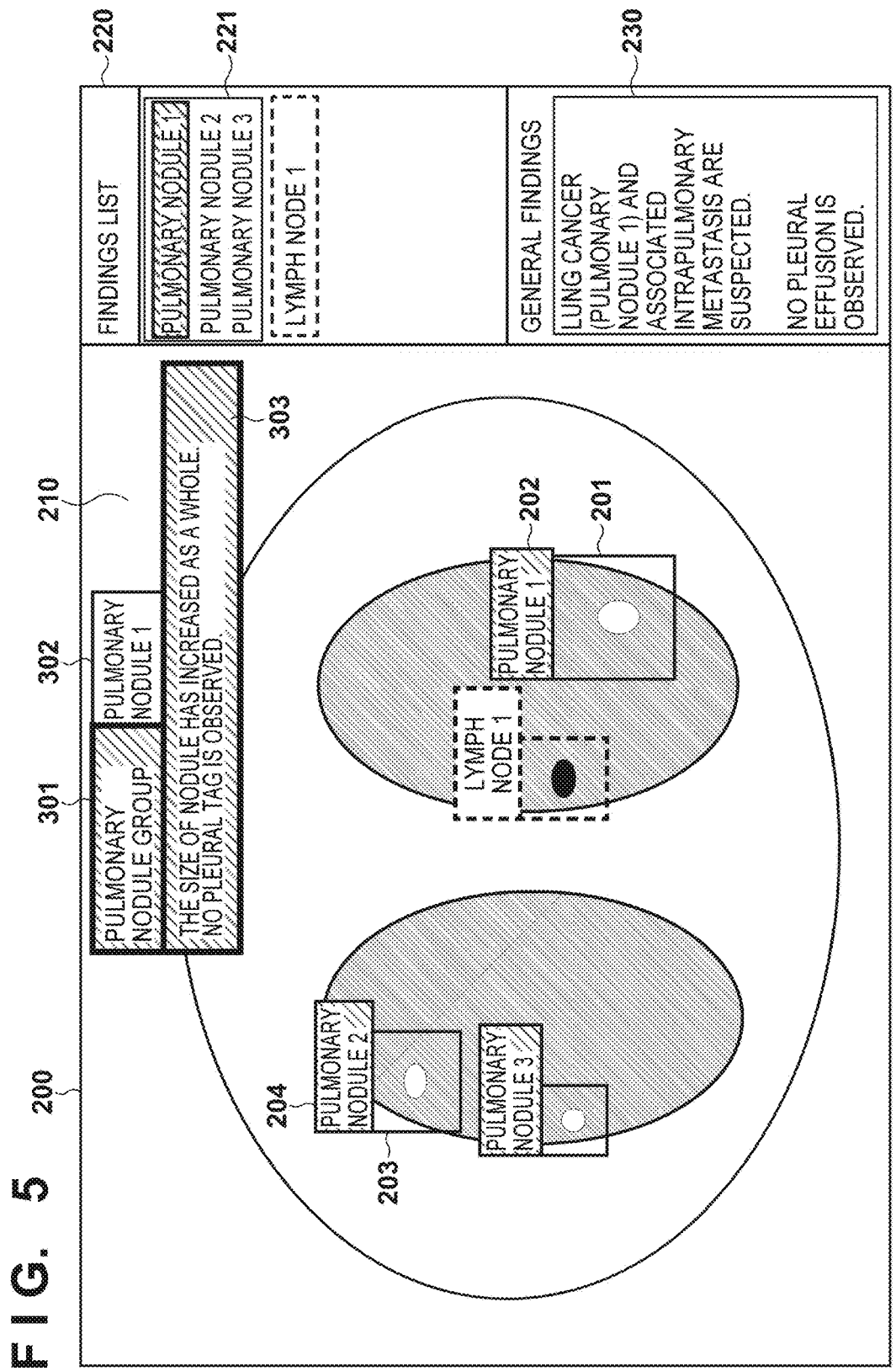
FIG. 5 is a view showing a display example of a screen on which an individual findings input field and a group findings input field are arranged.

In the above-described embodiment, an example in which the individual findings input field and the group findings input field are in parallel displayed has been described. In another embodiment of the present invention, an example in which an individual findings input field and a group findings input field are switchably displayed will be described. FIG. 5 shows a first screen display example in a case in which an individual findings input field and a group findings input field are arranged in a switchable form in a findings input window. Only portions different from the above-described embodiment or FIG. 4 will be described below.

Referring to FIG. 5, a findings input window 210 is displayed by a window display method generally called a tab format. A findings input field 303 is an input field serving as both an individual findings input field and a group findings input field. When the user selects an individual findings selection tab 302 (with pulmonary nodule 1 displayed) using a pointing device or a keyboard, a display control unit 43 displays an individual findings (of pulmonary nodule 1) in the findings input field 303. At this time, if the character string in the findings input field 303 is input or edited, a findings input unit 44 stores the character string in the findings input field 303 in a storage unit 34 as an individual findings information. Similarly, when the user selects a group findings selection tab 301 (with pulmonary nodule group displayed) using the pointing device or the keyboard, the display control unit 43 displays group findings information (of the pulmonary nodule group) in the findings input field 303. At this time, if the character string in the findings input field 303 is input or edited, the findings input unit 44 stores the character string in the findings input field 303 in the storage unit 34 as group findings information.

In the screen display example shown in FIG. 5, the group findings selection tab 301 is displayed on the left side of the individual findings selection tab 302. In the initial state, the group findings selection tab 301 is selected. If one group includes only one region of interest, the user need not always discriminate between the individual findings and the group findings. Hence, the contents described in the individual findings may be input in the group findings. In this case, if the user adds another region of interest to the group later, and no individual findings need be input for the newly added region of interest, the user can be saved from inputting individual findings. This is because already input group findings information is automatically displayed for the newly added region of interest, and, therefore, the interpretation result of the newly added region of interest is explained by the already input group findings even without inputting individual findings. Individual findings information is input only when findings information unique to the region of interest is found.

FIG. 6 shows a second screen display example in a case in which the individual findings input field and the group findings input field are arranged in a switchable form in the findings input window. Only portions different from that shown in FIG. 5 will be described below.

Referring to FIG. 6, tabs used to select three orthogonal cross-sectional images, that is, an Axial cross-sectional selection tab 311, a Coronal cross section selection tab 312, and a Sagittal cross section selection tab 313 are displayed under the individual findings selection tab 302. When the user selects one of the tabs using the pointing device or the keyboard, the display control unit 43 displays a cross-sectional image corresponding to the selected tab in an image display area 200 of a display unit 36. At this time, the display control unit 43 reconstructs the cross-sectional image by reading out, from the three-dimensional medical image data stored in the storage unit 34, pixel data existing at the cross-sectional position and in the cross-sectional direction to be displayed. In the example of FIG. 6, since the Coronal cross-sectional selection tab 312 of pulmonary nodule 1 is selected, a Coronal cross-sectional image at the cross-sectional position at which pulmonary nodule 1 is captured is displayed in the image display area 200.

As described above, when the individual findings input field and the group findings input field are switchably displayed, the findings corresponding to each region of interest and findings information common to the plurality of regions of interest can easily be edited/input in association with the regions of interest.

In still another embodiment of the present invention, an example of an arrangement capable of creating a group that can include another group and, thus, hierarchically forming groups will be described. FIG. 7 shows a third screen display example in a case in which an individual findings input field and a group findings input field are arranged in a switchable form in a findings input window. Only portions different from those shown in FIG. 5 will be described below.

Referring to FIG. 7, a findings input window 210 is displayed by a window display method using a tab format, as in the arrangement shown in FIG. 5. However, in FIG. 7, a group formed from a plurality of layers can be handled. A position-of-interest selection tab (individual findings selection tab) 302 (pulmonary nodule 1), a group findings selection tab 301 (pulmonary nodule group) of a first layer group, and a group findings selection tab 304 (intrapulmonary lesion) of a second layer group are displayed. To do the display shown in FIG. 7, a storage unit 34 stores information shown in FIGS. 8A, 8B, and 8C.

FIGS. 8A, 8B, and 8C are views showing an example (table format) of a storage method of position-of-interest information, first layer group information, and second layer group information stored in the storage unit 34 to handle the group of the plurality of layers shown in FIG. 7.

The table shown in FIG. 8A is almost the same as the table shown in FIG. 3A. That is, reference numerals 351, 352, and 354 in FIG. 8A correspond to reference numerals 341, 342 and 344 in FIG. 3A. However, the group label 343 in FIG. 3A is changed to a first layer group label 353 in FIG. 8A. As in FIG. 3A, the first layer group label 353 in FIG. 8A may be an empty character string (without the first layer group label).

FIG. 8B shows an example of a storage method of group findings information for each first layer group. The first row shows an explanation of the type of stored information. The explanation is illustrated to facilitate understanding of the drawing, and need not always be stored. Data to be actually stored are shown from the second row. Reference numeral 355 denotes a first layer group label shown in FIG. 8A. Reference numeral 356 denotes a group label of a second layer group to which each first layer group belongs. Reference numeral 357 denotes group findings information for each first layer group. Note that the group label of the second layer group may be an empty character string (without the second layer group label).

A position-of-interest acquisition unit 42 may be controlled to be inhibited from inputting a second layer group label, until the second layer group label is input (that is, if the character string is empty).

FIG. 8C shows an example of a storage method of group findings information for each second layer group. The first row shows an explanation of the type of stored information. The explanation is illustrated to facilitate understanding of the drawing, and need not always be stored. Data to be actually stored are shown from the second row. Reference numeral 358 denotes a second layer group label shown in FIG. 8B. Reference numeral 359 denotes group findings information for each second layer group.

Note that, it is obvious that a group including a higher-order layer can be stored by the same storage method as described above, and a group including a higher-order layer can be displayed by the same tab format display method as that shown in FIG. 7. A highest-order layer group may be used as a group to input general findings information. In this case, a general findings input area 230 is unnecessary.

As described above, in this embodiment, a group that can include a region of interest can be included by another group, and findings information can be input for each of the hierarchical groups. This allows the user to flexibly categorize a plurality of regions of interest and to input desired findings information for each of the layers of the groups. Note that, in this embodiment, an example in which the regions of interest are organized using a two-layered group structure has been described. However, the number of layers in a group may be three or more.

Figure 9:
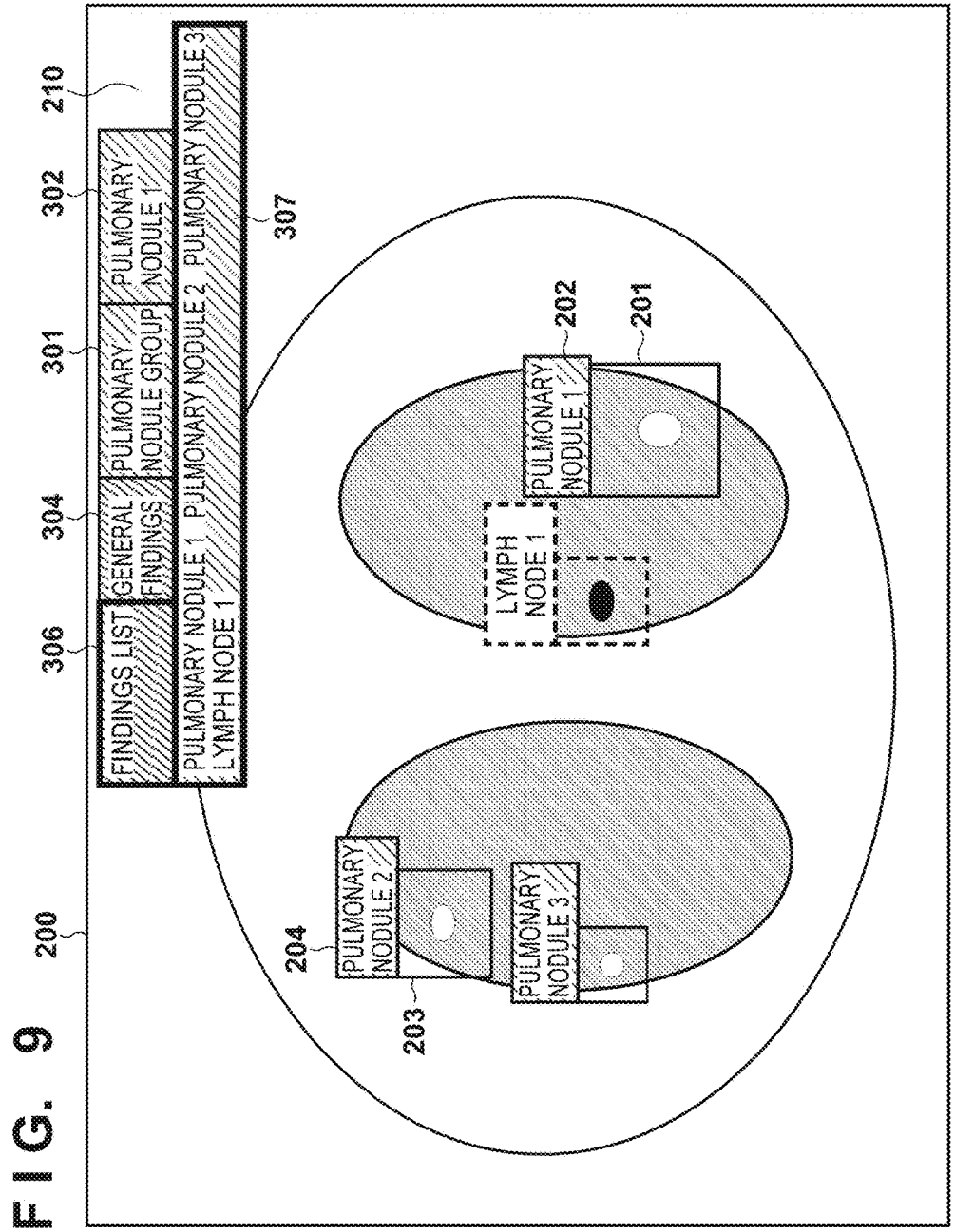
FIG. 9 is a view showing a display example of a screen on which an individual findings input field and a group findings input field are arranged.

In yet another embodiment of the present invention, an example of an arrangement capable of dividing a plurality of regions of interest into a plurality of groups of layers, and adding findings information to each region of interest or group will be described. FIG. 9 shows a fourth screen display example in a case in which an individual findings input field and a group findings input field are arranged in a switchable form in a findings input window. Only portions different from those shown in FIG. 7 will be described below.

Referring to FIG. 9, a findings input window 210 is displayed by a window display format using a tab format, as in FIG. 7. In FIG. 9, the second layer group is used to input general findings information. Hence, "general findings" is displayed in a group findings selection tab 304 of the second layer group.

Referring to FIG. 9, a findings list selection tab 306 is further displayed. When the user selects this tab, a display control unit 43 displays a position-of-interest list in a findings input/list display field 307. The findings input/list display field 307 has both the function of a findings input field 303 and the function of a position-of-interest list display area 220 in FIG. 5. That is, when the user selects an individual findings selection tab 302, a group findings selection tab 301, or the second layer group findings selection tab 304, the findings input/list display field 307 functions as the findings input field. On the other hand, when the user selects the findings list selection tab 306, the findings input/list display field 307 functions as the position-of-interest list display area.

Figure 10:
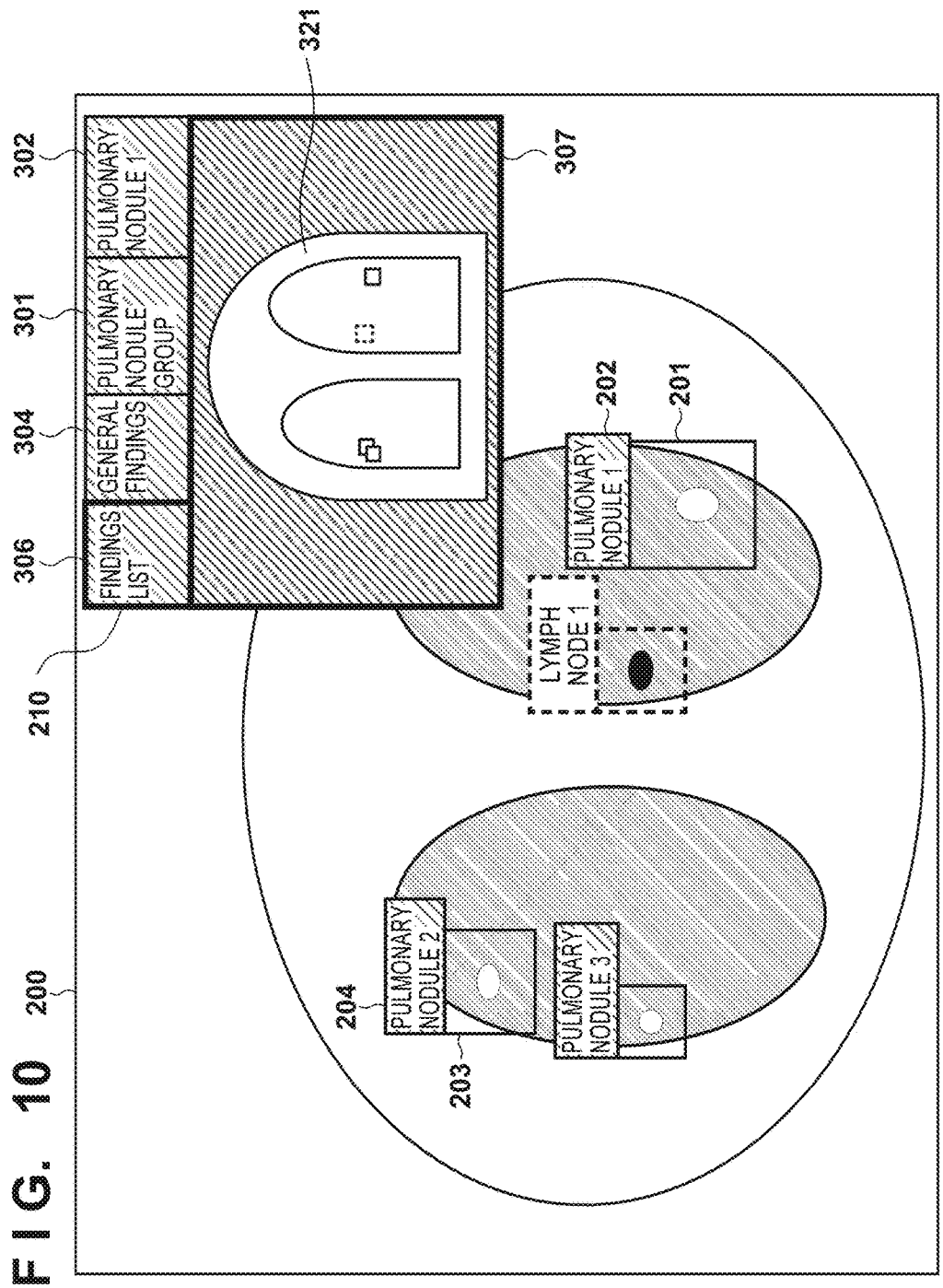
FIG. 10 is a view showing a display example of a screen on which an individual findings input field and a group findings input field are arranged.

FIG. 10 shows a fifth screen display example in a case in which the individual findings input field and the group findings input field are arranged in a switchable form in the findings input window. Only portions different from those shown in FIG. 9 will be described below.

In FIG. 9, when the user selects the findings list selection tab 306, a position-of-interest list is displayed as a character string in the findings input/list display field 307. On the other hand, in FIG. 10, when the user selects the findings list selection tab 306, a position-of-interest list is illustrated in the findings input/list display field 307. In the example of FIG. 10, a mark indicating each position of interest is displayed on an MIP (Maximum Intensity Projection) image 321 created from all cross-sectional images in the Coronal cross-sectional direction. Note that the MIP image is created by an existing method of projecting three-dimensional image data in a certain cross-sectional direction and, thus, creating two-dimensional image data. The display position of each position of interest on the MIP image is obtained as a two-dimensional position obtained by projecting the three-dimensional position (the slice position of an Axial tomographic image and the x- and y-coordinates in the Axial tomographic image) of each position of interest on the three-dimensional image data onto a projection cross section (Coronal cross section).

Concerning the above-described processing, at least some of the units provided in the control unit 37 may be implemented as independent devices. The units may be implemented as software that implements the functions of the units. In addition, at least some of functions implemented by the control unit 37 may be implemented by cloud computing. That is, the interpretation support apparatus 10 may be connected, via the LAN 21, to an arithmetic apparatus located in a place different from that of the interpretation support apparatus 10, and data is transmitted/received, thereby causing the arithmetic apparatus to execute the above-described processing.

As described above, according to the embodiments of the present invention, it is possible to clearly show the correspondence between findings information and a position of interest on an image, and to input a group findings information common to a plurality of positions of interest.

According to the present invention, it is possible to provide a technique capable of clearly showing the correspondence between findings information and a position of interest on an image, and inputting a findings information common to a plurality of positions of interest.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
   (a) a region acquisition unit adapted to acquire a plurality of regions of interest on a medical image of an object to be examined;
   (b) a designation unit adapted to designate regions of interest to be included in the same group out of the plurality of regions of interest, wherein the designation unit designates the regions of interest based on a user's instruction; and
   (c) a display control unit adapted to cause a display unit to display an individual input region used to input individual findings information for each of the plurality of regions of interest and a common input region used to input findings information common to the regions of interest included in the group, wherein the display control unit causes the display unit to display the individual input region and the common input region.

2. The apparatus according to claim 1, further comprising (d) an individual findings acquisition unit adapted to acquire the individual findings information for each of the plurality of regions of interest,
   wherein the display control unit causes the display unit to display, for each of the plurality of regions of interest, the individual findings information acquired for the region of interest in the individual input region of the region of interest.

3. The apparatus according to claim 1, further comprising (d) a common findings acquisition unit adapted to acquire the findings information common to the regions of interest included in the same group,
   wherein the display control unit causes the display unit to display, for each group, the common findings information acquired for the group in the common input region of the group.

4. The apparatus according to claim 1, wherein the display control unit causes the display unit to display the individual input region and the common input region separately.

5. The apparatus according to claim 4, wherein the display control unit causes the display unit to display the individual input region and the common input region in parallel.

6. The apparatus according to claim 4, wherein the display control unit causes the display unit to display the individual input region and the common input region switchably.

7. The apparatus according to claim 1, wherein the designation unit designates, for each of the plurality of regions of interest, whether to include the region of interest in an existing group or in a new group, or not to include the region of interest in any group, and
   the display control unit causes the display unit to display the common input region for each group.

8. The apparatus according to claim 1, wherein the designation unit designates, for a region of interest included in the plurality of regions of interest, which group of a plurality of group candidates is to include the region of interest, and
   the display control unit causes the display unit to display the common input region for each group.

9. The apparatus according to claim 1, further comprising (d) a storage unit adapted to store identification information of a region of interest and identification information of a group, including the region of interest in association with each other.

10. The apparatus according to claim 9, further comprising (d) a creation unit adapted to create a group that can include the region of interest.

11. The apparatus according to claim 10, wherein the creation unit creates a group including at least one region of interest.

12. The apparatus according to claim 11, wherein the creation unit creates the group by causing the storage unit to store the identification information of the group in association with the identification information of the region of interest.

13. The apparatus according to claim 9, wherein the storage unit further stores the individual findings information of the region of interest and the findings information common to the regions of interest included in the group including the region of interest in association with each other.

14. The apparatus according to claim 13, wherein, in response to addition of a new region of interest to the group, the storage unit associates the findings information common to the regions of interest included in the group with identification information of the new region of interest.

15. The apparatus according to claim 1, wherein the display control unit causes the display unit to display the medical image, information representing a position of each of the plurality of regions of interest included in the medical image, and information representing the group to which the plurality of regions of interest belong.

16. The apparatus according to claim 1, wherein the region acquisition unit acquires information representing one of a position and a range on the medical image as the region of interest.

17. The apparatus according to claim 1, wherein the display control unit causes the display unit to display the regions of interest included in the same group in the same display form.

18. The apparatus according to claim 1, wherein the display control unit causes the display unit to show a correspondence to the region of interest on the medical image and to display the individual input region of the region of interest.

19. An information processing apparatus comprising:
(a) an individual findings acquisition unit adapted to acquire individual findings information for each of a plurality of regions of interest on a medical image of an object to be examined;
(b) a designation unit adapted to designate regions of interest to be included in the same group out of the plurality of regions of interest, wherein the designation unit designates the regions of interest based on a user's instruction;
(c) a common findings acquisition unit adapted to acquire findings information common to the regions of interest included in the group;
(d) an association unit adapted to associate the individual findings information with the common findings information for each of the regions of interest included in the group in order to generate associated information; and
(e) a display control unit adapted to cause a display to display the associated information.

20. An information processing apparatus comprising:
(a) a region acquisition unit adapted to acquire a plurality of regions of interest on a medical image of an object to be examined;
(b) a designation unit adapted to designate regions of interest to be included in the same group out of the plurality of regions of interest, wherein the designation unit designates the regions of interest based on a user's instruction; and
(c) a display control unit adapted to cause a display unit to display a common input region used to input findings information common to the regions of interest included in the group, wherein the display control unit causes the display unit to display the common input region.

21. An information processing system comprising:
(a) a region acquisition unit adapted to acquire a plurality of regions of interest on a medical image of an object to be examined;
(b) a designation unit adapted to designate regions of interest to be included in the same group out of the plurality of regions of interest, wherein the designation unit designates the regions of interest based on a user's instruction; and
(c) a display control unit adapted to cause a display unit to display an individual input region used to input individual findings information for each of the plurality of regions of interest and a common input region used to input findings information common to the regions of interest included in the group, wherein the display control unit causes the display unit to display the individual input region and the common input region.

22. An information processing system comprising:
(a) an individual findings acquisition unit adapted to acquire individual findings information for each of a plurality of regions of interest on a medical image of an object to be examined;
(b) a designation unit adapted to designate regions of interest to be included in the same group out of the plurality of regions of interest, wherein the designation unit designates the regions of interest based on a user's instruction;
(c) a common findings acquisition unit adapted to acquire findings information common to the regions of interest included in the group;
(d) an association unit adapted to associate the individual findings information with the common findings information for each of the regions of interest included in the group in order to generate associated information; and
(e) a display control unit adapted to cause a display unit to display the associated information.

23. An information processing system comprising:
(a) a region acquisition unit adapted to acquire a plurality of regions of interest on a medical image of an object to be examined;
(b) a designation unit adapted to designate regions of interest to be included in the same group out of the plurality of regions of interest, wherein the designation unit designates the regions of interest based on a user's instruction; and
(c) a display control unit adapted to cause a display unit to display a common input region used to input findings information common to the regions of interest included in the group, wherein the display control unit causes the display unit to display the common input region.

24. An information processing method comprising:
acquiring, by a region acquisition unit, a plurality of regions of interest on a medical image of an object to be examined;
designating, by a designation unit, regions of interest to be included in the same group out of the plurality of regions of interest, wherein the designation unit designates the regions of interest based on a user's instruction; and
causing, by a display control unit, a display unit to display an individual input region used to input individual findings information for each of the plurality of regions of interest and a common input region used to input findings information common to the regions of interest included in the group.

25. An information processing method comprising:
acquiring, by an individual findings acquisition unit, individual findings information for each of a plurality of regions of interest on a medical image of an object to be examined;
designating, by a designation unit, regions of interest to be included in the same group out of the plurality of regions of interest, wherein the designation unit designates the regions of interest based on a user's instruction;
acquiring, by a common findings acquisition unit, findings information common to the regions of interest included in the group;
associating, by an association unit, the individual findings information with the common findings information for each of the regions of interest included in the group and generating associated information; and causing, by a display control unit, a display unit to display the associated information.

26. An information processing method comprising:
acquiring, by a region acquisition unit, a plurality of regions of interest on a medical image of an object to be examined;
designating, by a designation unit, regions of interest to be included in the same group out of the plurality of regions of interest, wherein the designation unit designates the regions of interest based on a user's instruction; and
causing, by a display control unit, a display unit to display a common input region used to input findings information common to the regions of interest included in the group.

27. A non-transitory computer-readable storage medium storing a computer program for causing a computer to function as each unit of an information processing apparatus comprising:

a region acquisition unit adapted to acquire a plurality of regions of interest on a medical image of an object to be examined;
a designation unit adapted to designate regions of interest to be included in the same group out of the plurality of regions of interest, wherein the designation unit designates the regions of interest based on a user's instruction; and
a display control unit adapted to cause a display unit to display an individual input region used to input individual findings information for each of the plurality of regions of interest and a common input region used to input findings information common to the regions of interest included in the group, wherein the display control unit causes the display unit to display the individual input region and the common input region.

* * * * *